United States Patent [19]

Thompson

[11] Patent Number: 4,491,645

[45] Date of Patent: Jan. 1, 1985

[54] LEATHER TREATMENT COMPOSITION

[75] Inventor: John A. Thompson, Milwaukee, Wis.

[73] Assignee: Henkel Corporation, Minneapolis, Minn.

[21] Appl. No.: 374,577

[22] Filed: May 3, 1982

[51] Int. Cl.³ .......................... C08L 33/14; C08K 5/09
[52] U.S. Cl. .................................... 524/112; 524/522; 525/193; 525/221; 252/8.57
[58] Field of Search ................ 525/193, 221; 524/112, 524/522

[56] References Cited

U.S. PATENT DOCUMENTS 2,746,837  5/1956  Kirk ...................................... 8/94.33
4,314,800  2/1982  Monsheimer et al. ............ 8/94.1 R Primary Examiner—Carman J. Seccuro
Attorney, Agent, or Firm—Ernest G. Szoke; Patrick J. Span

[57] ABSTRACT

The present invention describes leather top coat compositions which are not dependent upon nitrocellulose comprising a mixture of acrylate copolymers and an aliphatic cyclic anhydride.

17 Claims, No Drawings

LEATHER TREATMENT COMPOSITION

BACKGROUND OF THE INVENTION

1. Field of the invention.

This invention relates to leather treatment products.

2. Description of the art practices.

The leather industry is itself nearly as old as mankind, it being found that animal skins when properly treated make excellent long lasting clothing items as well as other products. The green hides obtained from the slaughterhouse are usually treated by removing the hair from the hide. This is referred to as the hair burn operation. A secondary step in the treatment of the hide after the hair is removed is the extraction of the essential oils present in the hide leaving the protein component of the hide intact. Thereafter protein coagulating agents such as chromium are used to cross-link the protein thereby preserving the leather.

The essential oils of the hide are then returned into the product to provide a flexible product. The oil replacement step depending on the type of leather being treated may be with a different formulation of oils than that originally removed from the hide. That is components such as soaps and other unwanted by-products are conventionally removed by a leather chemcial processor before the oil is replaced in the leather. At this point the product is referred to as the leather crust which is ready for the various finishing operations conducted by the leather industry.

The product is then treated with a dye coat or stain coat which may be sprayed or seasoned onto the product. Typically the dyes used are of the aniline family which are both organic and transparent materials which provide a deep luster and color in the product. The term seasoning may be equated with swabbing on and hand treating of the leather as opposed to the spray. Depending on the type of garment or leather product involved one or both methods may be used.

The next step after placing the dye coat or stain coat (to give the deep coloration into the leather) is the pigmentation step. Typically the pigmentation step involves applying to the product a mixture of an inorganic pigment, resins, waxes, binders and water. The water is of course used mainly to obtain the consistency of the product to be applied and should not be considered to be an essential ingredient. Typical pigments used to color the leather are: titanium dioxide, lead chromates, lead molybdates, iron oxides, zinc sulfides and cadmium sulfides, selenides and sulfoselenides.

The resins employed at this point are materials such as acrylic resins or latex materials which hold the coating containing the pigment to the product and also to allow flexibility so that the pigmentation is not free to crack or flake off of the product. The waxes which are applied at this point are typically wax emulsions which add hardness and feel (hand) to the product. The concept of feel or hand is subjective, however, it can commonly be observed that some garments feel good while other garments do not. Typically plastic products such as those formulated from vinyl resins do not breathe and have an extremely smooth finish. Leather while having a smooth feeling finish should have a sufficient of degree of resistance to the stroke of the hand to give the feeling that one is dealing with a natural skin. The waxes employed at this point allow a plate release to be effected upon sheet pressing and to mold the smooth finish as previously described. The plate release arises from the fact that many leathers are treated by pressing with a hot plate which is typically a smooth metal surface either as a roller or a flat plate. It is of course essential that the wax assists in obtaining a product where the leather treatment chemicals are not retained on the plate but rather are forced into the leather product.

The binders employed at this point are ordinarily caesin based which assists in drying the film to a stable surface. That is even though the plate release may not be a problem because of the wax emulsion it is generally found necessary to utilize a binding agent to ensure that the product does not become freed from the leather. As previously mentioned the water is used as a carrier and is not of any particular consequence.

The particular aspect with which the present invention is concerned is in the top coat operation. Top coating is the last application or applications applied to the leather. That is, after the pigmentation step has been completed a top coat of one or two more coats is added to ensure that there is a flexible coating over the pigmentation to prevent wear and to add a degree of hardness to the coating beyond the natural strength of the leather. Of course the top coating should not be such that it leaves the goods with a plastic feel or as previously mentioned a lack of hand or feel.

The conventional top coats known in the art are those containing urethanes, vinyl coatings, cellulose acetate butryate resins (CAB) and nitrocellulose. Each of the foregoing types of types of top coatings have particular applications.

The urethane top coats are exceptional with respect to wear and tear. Automobile seats where there is considerable wear are often protected by a top coat which is urethane based. Urethane unfortunately does not breathe and does not exhibit a reasonable feel such as is desired in a leather product. However for the wear factor the leather is quite well protected by a urethane coating. The lack of breathing however can cause the product to become quite hot and this phenonma will be readily recognizable to those who have sat upon a urethane coated automobile seat.

The vinyl coatings also show promise in resistance and are typically utilized for the top coating of childrens shoes. Automobile seats and leather furniture are also often treated with vinyl. Again the vinyl exhibits a plastic feel rather than the natural hand of other types of leather, and vinyl does not breathe and becomes hot when it is in close contact with the human body.

The cellulose acetate butyrate resins are a first attempt at reducing the need for nitrocellulose coatings as described below. The CAB resins are non-yellowing which is a stated defect in nitrocellulose treated products. The feel of CAB products is good but is at a substantial cost when compared to nitrocellulose. Accordingly the cellulose acetate butyrate coatings have found limited utility due to the high cost.

Nitrocellulose top coats are the standard in the industry particularly for shoe upper leather. That is the general requirements for shoe upper leather are that the coating be breathable, have a high degree of resistance to scuffing and also present a highly polished surface. As previously noted the nitrocellulose top coats are deficient in that they have limited utility on white and pastel colors in that ultraviolet radiation yellows nitrocellulose top coated products. Accordingly there is a limiting factor in nitrocellulose usage. A second deficiency in utilizing nitrocellulose is that it must be used in a solvent (organic) or solvent plus water borne formulation. The difficulties in utilizing nitrocellulose are that the product is flammable and can be flammable on the treated goods even after the solvent is removed. It may be remembered that nitrocellulose is also referred to as gun cotton and the products must be stored and mixed under careful consitions to avoid the possibility of fire. Nitrocellulose as noted is the standard in the industry as it provides shoe upper leather with good hand and resistance, non-plastic feel and also protects the pigmented leather beneath the top coat.

One attempt which has been made to avoid the flammable nature of the nitrocellulose is to include a chlorinated solvent which functions to lessen the explosive nature of the vapors of the nitrocellulose and the organic solvents otherwise employed in the formulation. This solution presents other problems including air pollution due to these materials and worker exposure. It is also noted that nitrocellulose is difficult to work with in that once the solvent is removed (or should the nitrocellulose be dumped into a drain) it is not water soluble and exhibits a gelling tendancy. This of course may block the sewer drains or provide difficulty in removing the nitrocellulose from the container in which it is stored.

The last aspect of the top coating operation is to plate the leather article. The methods of plating include pressing the top coated leather article with a hot plate or a hot roll such as the Finiflex ™ roll machine. The Finiflex roll machine as the name implies rolls over the leather and raises the temperature of the leather to a temperature to about 140° C. to about 200° C. The top coat must be resistant to removal as was previously noted in the discussion above during the plating operation.

It therefore remains to find a suitable top coat to replace nitrocellulose. The desirable aspects of such a top coat are to be an aqueous borne material which does not yellow but gives good hand and protects from scuffing. The present invention has solved the problem of finding a replacement for the nitrocellulose based coatings in a concentrated aqueous formulation.

Throughout the specification and claims percentages and ratios are given by weight, temperatures are in degrees Celsius and pressure is expressed in atomospheres. A vinyl copolymer is defined as a polymer formed from monomers having unsaturation which becomes saturated and during linear polymerization.

SUMMARY OF THE INVENTION

The present invention describes a leather treating composition comprising:

(a) from about 0.5% to about 3% by weight of an aliphatic cyclic anhydride;

(b) from about 3.75% to about 12% by weight of a copolymer of a member selected from the group consisting of:
(i) methyl acrylate and methylmethacrylate and mixtures thereof and,
(ii) ethyl acrylate and,
(iii) acrylic acid and methacrylic acid and mixtures thereof
in a weight ratio of (i) to (ii) of about 2:1 to about 1:2 and a weight ratio of (i) or (ii) to (iii) of about 50:1 to 8:1;

(c) from about 3.75% to about 12% by weight of a copolymer of:
(i) a member selected of the group consisting of butyl methacrylate and butyl acrylate and mixtures thereof,
(ii) a member selected from the group consisting of hydroxyethylmethacrylate and hydroxyethylacrylate and mixtures thereof,
(iii) a member selected from the group consisting of methyl acrylate and methyl methacrylate and mixtures thereof,
(iv) a member selected from the group consisting of acrylic acid and methacrylic acid and mixtures thereof,
in a weight ratio of (i) to (iii) of from about 2:7 to about 1:7; and a weight ratio of (ii) to (iii) of about 1:30 to about 1:10; and a weight ratio of (i) to (iv) of 25:1 to 15:1;

(d) from about 70% to about 92% by weight of water; and, (e) a sufficient amount of base to maintain an alkaline pH.

This invention also describes a method of treating a leather article comprising contacting the article with the composition described above and further employing heat and pressure treatment. This process utilizes a product comprising:

(a) from about 0.15% to about 1.25% by weight of an aliphatic cyclic anhydride;

(b) from about 1.5% to about 4.5% by weight of a copolymer of a member selected from the group consisting of:
(i) methyl acrylate and methylmethacrylate and mixtures thereof and,
(ii) ethyl acrylate,
(iii) acrylic acid and methacrylic acid and mixtures thereof
in a weight ratio of (i) to (ii) of about 2:1 to about 1:2 and a weight ratio of (i) to (iii) of about 50:1 to 8:1;

(c) from about 1.5% to about 4.5% by weight of a copolymer of:
(i) a member selected of the group consisting of butyl methacrylate and butyl acrylate and mixtures thereof,
(ii) a member selected from the group consisting of hydroxyethylmethacrylate and hydroxyethylacrylate and mixtures thereof,
(iii) a member selected from the group consisting of methyl acrylate and methyl methacrylate and mixtures thereof,
(iv) a member selected from the group consisting of acrylic acid and methacrylic acid and mixtures thereof,
in a weight ratio of (i) to (iii) of from about 2:7 to about 1:7; and a weight ratio (ii) to (iii) of 1:30 to 1:10; and a weight ratio of (i) to (iv) of 25:1 to 15:1;

(d) from about 88% to about 96% by weight of water; and, (e) a sufficient amount of base to maintain an alkaline pH.

A further aspect of this invention is to prepare a product containing:

(a) from about 0.5% to about 3% by weight of an aliphatic cyclic anhydride;

(b) from about 3.75% to about 12% by weight of a vinyl copoylymer having free carboxylic groups and a glass transition temperature of from about 35° to about 45° C.;

(c) from about 3.75% to about 12% of a vinyl copolymer having free hydroxyl groups and a glass transition temperature of from about 15° to about 22° C.;

(d) from about 70% to about 92% by weight of water; and, (e) a sufficient amount of base to maintain an alkaline pH.

Preferably component (c) above also contains free carboxyl groups.

DETAILED DESCRIPTION OF THE INVENTION

The method of forming a topcoat on a leather article is generally carried out by spraying an emulsion of the coating formulation upon the leather article. A mural or precision coating operation may also be used to apply a top coating. The difference between the types of top coating are that in spraying an even application of the coating formulation is desired. The spraying is generally conducted by using a series of eight spray guns rotating about an axis which is perpendicular to the leather article. The leather is then passed on rollers beneath the spray guns to obtain an even top coating treatment.

The mural is used to place a design on the leather as well as applying the top coating. The mural is generally done utilizing a roller containing an uneven surface which imparts a design and generally an uneven solution of the coating material to the leather article. Typically a mural application is used to impart a grainey finish to the leather to simulate the natural texture of the leather which is often lost or removed intentionally during the earlier treatment of the article.

An additional treatment of the leather article which is usually conducted before the top coating is placed upon the article is to split the leather. The splitting is done by cutting a narrow thickness of the flesh (non-grain side) away from the product. While the leather could be split at an earlier stage it is generally desired to conduct the splitting immediately before the top coating to avoid damage to the leather article through machine handling. That is, the thicker that the leather article is during the early stages of processing the more likely it is to be resistant to inadvertent cutting and tearing.

A distinct advantage in spraying or mural treating of leather with the composition of the present invention is that the product is water borne and need not be cut with a flammable or combustible solvent. That is the nitrocellulose, CAB, vinyl, or urethane are to a large extent dependent upon organic solvents which lead to air pollution and hazards within the plant when explosive concentrations are reached. These solvent systems include materials such as methyl hexyl ketone, butyl cellosolve acetate, or butyl acetate. The compositions of the present invention are advantageous in that they are aqueous emulsions which are easily cleaned up and are non-flammable.

A further distinct advantage of the present invention is that the composition may be shipped in a much more concentrated fashion than can the solvent based topcoats currently in use. That is nitrocellulose is typically sold to be diluted out to three parts nitrocellulose per one part solvent system. The products of the present invention are easily formulated to be one part product to two parts water. Accordingly utilizing the aqueous borne system of the present invention at conventional levels of the active ingredients, three drums of the concentrated product of the present invention will yield nine drums of a sprayable top coating formulation. The nitro-cellulose based product requires three drums of product and one drum of solvent to yield only four drums of a sprayable formulation.

The bottom line considering the transportation costs is that the present formulation requires less than half the transporation costs of a nitrocellulose solvent based system. It should also be further mentioned that nitrocellulose based coatings also have the potential to burn even after the solvent has been driven off in processing. Thus the handling of a nitrocellulose top coated leather article is still more dangerous than the aqueous treated product of the present invention. In fact leather articles treated with nitrocellulose are able to support combustion even in the finished article.

The first component to be discussed in the context of the present invention is the amount of water in the formulation. The amount of water in the formulation as described in the compositional aspect of the Summary is of particular importance. That is that it has been found that if the water content is too great in the product excess shipping costs result whereas if the water content of the formulation is too little the products shelf life may be adversely affected. Therefore the amount of water in the concentrated leather coating composition should be from about 70% to about 92%; preferably from about 75% to about 85%; and most preferably from about 78% to 82% by weight of the finished product.

It is noted at this point that the various components may be mixed in a fairly random order as long as the overall compositional aspect of the present invention is still maintained. With respect to components (b) and (c) it is desirable to maintain these components in a fairly dilute aqueous solution to enhance the shelf life of the product. This aspect of the invention is shown in the examples.

The aliphatic anhydride component is utilized in the concentrated formulation represented in the Summary at from about 0.5% to 3.0%; preferably from about 0.75% to 2.5% and most preferably at from 1% to 2% by weight of the product. The anhydride satisfies the requirement for a wax like substance which is used to provide a lustrous finish and good feel to the leather article. The anhydride must be a cyclic material, i.e. when the carboxyl groups are within the cyclical structure.

The anhydride is described as preferably containing from 24 to 54 carbon atoms and containing unsaturation located in the beta position to the anhydride radical. The anhydride as previously noted is preferably obtained as a maleic or succinic group. More preferably the carbon content of the anhydride is from 30 to 44 carbon atoms. By aliphatic it is meant that the component must have a substantial aliphatic moeity attached to the cyclic group. The anhydride is desirably a material which is an alkenyl anhydride most preferably containing unsaturation at the beta position (between the second and third carbon atoms from the juncture of the alkenyl chain to the first cyclic carbon in the anhydride group). A highly preferred anhydride is $C_{33}H_{67}CH=CH-CH_2-X$, where X is the succinic or maleic radical.

The next component of the present invention to be discussed is component (b) which is a copolymer containing methyl acrylate or methylmethacrylate with ethyl acrylate. Components (b) (i) and (b) (ii) are used in a weight ratio of from about 2:1 to about 1:2 preferably about 3:2 to about 2:3 to form the copolymer. The preferred polymer contains as (i) and (ii) methylmethacrylate and ethyl acrylate in a 1:1 weight ratio. Component (b) (iii) in this copolymer is preferably acrylic acid which is employed at a ratio of (b) (i) or (b) (ii) to (b) (iii)

of 48:1 to 9:1. A desirable variation of the present invention is to obtain copolymer (b) which has a glass transition temperature of from about 35° C. to about 45° C., preferably from about 37° C. to about 42° C. The glass transition temperature of component (b) or component (c) may be determined by any convenient method such as that suggested by Rohm and Haas publication CM-24 L/cb herein incorporated by reference.

Component (b) is conveniently used in the present invention as a premixture with water at a concentration from about 30 to 90 percent water with the remainder of the product being solids when the polymerization reaction is conducted. Conveniently the water content may be from 40 to 70 percent in the product. As it will be appreciated when the more dilute solution of component (b) is utilized there may be some additional difficulty encountered in balancing the total aqueous content of the formulation as recited in the Summary. Component (b) is preferably used at a level of from 5% to about 10% by weight. Components (b) and (c) are mainly composed of the described monomers, however, small amounts of other monomers may be present.

Component (c) as noted in the Summary is preferably utilized at from 5% to about 10% by weight. Component (c) is a copolymer preferably formed from butyl methacrylate, hydroxyethylmethacrylate, methylacrylate, and acrylic acid. The monomers component (c) (i) to c (ii) are preferably utilized in a weight ratio of from about 7:28 to about 5:28. The preferred weight ratio (c) (ii) to (c) (iii) is about 1:27 to about 1:12. The preferred weight ratio of (c) (i) to (c) (iv) is about 22:1 to about 17:1. Components (i) and (iii) are desirably utilized in a weight ratio of five parts of the methylacrylate to one part butyl methacrylate.

Component (c) is conveniently utilized in the present product by obtaining the material as a dilute aqueous solution containing conveniently as little as 30% water to as high as 90% water. Of course when utilizing the higher aqueous concentrations of component (c) there is some difficulty as the remaining components must be adjusted to ensure that the aqueous content of the product is not raised to greatly. Component (c) desirably has a glass transition temperature of 15° C. to 22° C.; preferably 16° C. to 20° C.

The last aspect of the present invention is the introduction of a sufficient amount of base to maintain an alkaline pH, preferably greater than 7.5, more preferably 8 to 9 in the product of the present invention. The preferred base for use in the present invention is ammonia. Other bases which may be used but which are less desirable than ammonia include methylamine, triethanolamine, ethanolamine, diethanolamine, and ethyl amine and mixtures thereof. Ammonia will be driven off in the top coating application and thus does not form a part of the coating. This is particularly desirable as some bases are retained in the coating and thus their presence must be minimized. Conveniently the finished formulation as represented in the Summary contains from about 0.5% to 3%, preferably from about 0.75% to 1.5% by weight of the base.

What follows below is a general description of formulating the product of the present invention.

The products as previously noted are formulated with a minimal amount of water present (to ensure that the product does not polymerize prior to its application to the leather article). Components (b) and (c) are preferably obtained and used as in the Examples to avoid gelling the product in the reaction mixture. The product as represented in the Summary of the Invention is conveniently diluted out at two parts of water to one part of the product. This of course may be varied depending upon the application. The amount of water in the top coating as applied by the customer is preferably about 88.5% to 95% by weight. This will depend upon the desired strength and spraying capacity of the composition.

In practice the top coating formulation will be sprayed or muralled onto the leather article. The leather is then subjected to heat and pressure treatment ordinarily in a sequential operation. The top coat should be substantially dry prior to applying the pressure treatment. The pressure forces the top coating into the leather article thereby completing the leather treatment process. One or two top coats are ordinarily all that is required for most operations such as the manufacture of shoe upper leather. If desired there may of course be more than one top coat application employed.

The following are suggested embodiments of the present invention:

EXAMPLE 1

A leather top cotaing product is prepared by adding to a mixing vessel in the order given below:
20.4% water
19.45% component (b) which is copolymer of methylmethacrylate, ethyl acrylate and acrylic acid in a weight ratio 4.25:4.25:0.25 in 10.7 parts water
19.45% component (c) which is a copolymer of 8.75 parts butylmethacrylate, hydroxethylmethacrylate, methylacrylate and acrylic acid in a respective weight ratio of 19:4:76:1 in 10.7 parts water.
1% ammonia This mixture is mixed thoroughly and the pH is maintained at from 8.5 to 9.5. Then a second mixture containing anhydride $C_{33}H_{67}CH=CH-CH_2X$ (where X is maleic anhydride) is added at 8.96%. This second mixture is 15% anhydride, 80% water and 5% by weight ammonia.

Thereafter 30.67% additional water is added and the entire mixture agitated. The pH of the product is from 8.5 to 9.0. The product is strained to remove extraneous components and packed for shipment. The product for component (b) and (c) has a separate glass transition temperature of 38.8° C. and 17.8° C. respectively, and an average glass transition temperature of 28.3° C. The product may be used as described herein as a topcoating to impart a good feel, good UV light resistance, adhesion and abrasion resistance. Similar products may be prepared using the variables described herein.

What is claimed is:
1. A leather treating composition comprising:
   (a) from about 0.5% to about 3% by weight of an aliphatic cyclic anhydride;
   (b) from about 3.75% to about 12% by weight of a copolymer of a member selected from the group consisting of:
      (i) methyl acrylate and methylmethacrylate and mixtures thereof and,
      (ii) ethyl acrylate and,
      (iii) acrylic acid and methacrylic acid and mixtures thereof
   in a weight ratio of (i) to (ii) of about 2:1 to about 1:2 and a weight ratio of (i) or (ii) to (iii) of about 50:1 to 8:1;
   (c) from about 3.75% to about 12% by weight of a copolymer of:

(i) a member selected of the group consisting of butyl methacrylate and butyl acrylate and mixtures thereof, (ii) a member selected from the group consisting of hydroxyethylmethacrylate and hydroxyethylacrylate and mixtures thereof, (iii) a member selected from the group consisting of methyl acrylate and methyl methacrylate and mixtures thereof, (iv) a member selected from the group consisting of acrylic acid and methacrylic acid and mixtures thereof;

in a weight ratio of (i) to (iii) of from about 2:7 to about 1:7; and a weight ratio of (ii) to (iii) of about 1:30 to about 1:10; and a weight ratio of (i) to (iv) of 25:1 to 15:1;

(d) from about 70% to about 92% by weight of water; and, (e) a sufficient amount of base to maintain an alkaline pH.

2. The composition of claim 1 wherein component (a) is present at from about 0.75% to about 2.5% by weight.

3. The composition of claim 1 wherein component (b) is present at from about 5% to about 10% by weight.

4. The composition of claim 1 wherein component (a) contains from about 24 to 54 carbon atoms.

5. The composition of claim 1 wherein component (b) contains (i) methylmethacrylate and (ii) ethylacrylate.

6. The composition of claim 1 wherein component (c) is present at from about 5% to about 10% by weight.

7. The composition of claim 1 wherein component (d) is present at from about 75% to about 85% by weight.

8. The composition of claim 1 wherein the glass transition temperature of component (b) is from about 35° C. to about 45° C.

9. The composition of claim 1 wherein component (d) is present at from about 78% to 82% by weight.

10. The composition of claim 1 wherein the weight ratio of component (b)(i) to (b)(ii) is from about 3:2 to about 2:3.

11. The composition of claim 1 wherein the weight ratio of component (c) (ii) to (c) (iii) is from about 1:27 to about 1:12.

12. The composition of claim 1 wherein component (e) is ammonia and component (a) is a maleic anhydride.

13. The composition of claim 1 wherein component (a) is $$C_{33}H_{67}CH=CH-CH_2-X$$

wherein X is a maleic anhydride or succinic anhydride radical.

14. The composition of claim 1 wherein component (c) has a glass transition temperature of from about 15° C. to 22° C.

15. The composition of claim 1 wherein component (a) is an alkenyl anhydride.

16. The composition of claim 1 wherein component (b) contains as (iii) acrylic acid.

17. A product containing:
(a) from about 0.5% to about 3% by weight aliphatic cyclic anhydride;
(b) from about 3.75% to about 12% by weight of a vinyl acrylate copolymer having free carboxyl groups and a glass transition temperature of from about 35° to about 45° C.;
(c) from about 3.75% to about 12% of a vinyl acrylate copolymer having free hydroxyl groups and a glass transition temperature of from about 15° to about 22° C.;
(d) from about 70% to about 92% by weight of water; and
(e) a sufficient amount of base to maintain an alkaline pH.

* * * * *